United States Patent

[11] 3,596,001

[72] Inventor Clark Adrian P.
Taplow, England
[21] Appl. No 866,136
[22] Filed Oct. 9, 1969
[45] Patented July 27, 1971
[73] Assignee British Telecommunications Research Limited
Taplow, England
Continuation of application Ser. No. 584,419, Oct. 5, 1966, now abandoned.

[54] FREQUENCY DIVISION MULTIPLEXING
2 Claims, 7 Drawing Figs.

[52] U.S. Cl. .......... 179/15 FD
[51] Int. Cl. .......... H04j 1/20
[50] Field of Search .......... 179/15 AY

[56] References Cited

UNITED STATES PATENTS

| | | | |
|---|---|---|---|
| 2,403,385 | 7/1946 | Coughlin | 179/15 |
| 2,522,368 | 9/1950 | Guanella | 179/15 |
| 2,611,036 | 9/1952 | Norgaard | 179/15 |
| 2,802,208 | 8/1957 | Hobbs | 179/15 |
| 2,878,318 | 3/1959 | Leek | 179/15 |
| 3,349,182 | 10/1967 | Ito et al. | 179/15 |
| 3,364,311 | 1/1968 | Webb | 179/15 |
| 3,430,143 | 2/1969 | Walker et al. | 179/15 |

*Primary Examiner*—William C. Cooper
*Assistant Examiner*—David L. Stewart
*Attorney*—Dezsoe Steinberz

ABSTRACT: In a time division multiplex electrical signalling system having a main carrier modulated by a first group of subcarriers to produce signals in frequency bands of higher frequency than the main carrier and a second group of subcarriers arranged to modulate the main carrier to produce signals in frequency bands having lower frequency than that of the main carrier. Each subcarrier of the first group is modulated with respect to the main carrier by a respective information-bearing signal and each subcarrier of the second group is modulated with respect to a respective subcarrier of the first group by an information-bearing signal.

Fig.1.

| ELEMENT VALUE DATA-CHAN'L 1 | ELEMENT VALUE DATA-CHAN'L 2 | PHASES OF $f_1$ AND $f_2$ RELATIVE TO $f_c$ AT THE BEGINNING OF THE SIGNAL ELEMENT | RESULTANT MODULATION METHOD APPLIED TO CENTRAL CARRIER $f_c$ | RESULTANT MODULAT'G WAVE FORM OVER DURATION OF SIGNAL ELEMENT | OVERALL MODULATION METHOD USED | PHASE OF PM SIGNAL MODULAT'G $f_c$, RELATIVE TO SIGNAL-ELEMENT BOUNDARIES |
|---|---|---|---|---|---|---|
| 0 | 0 | 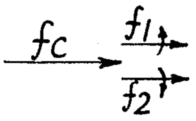  | AM | 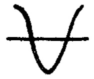 | PM-AM | ÷90° |
| 1 | 0 | 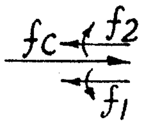  | AM |  | PM-AM | -90° |
| 0 | 1 | 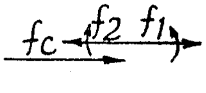  | FM |  | PM-FM | +90° |
| 1 | 1 | 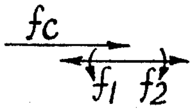  | FM |  | PM-FM | -90° |

FREQUENCY DIVISION MULTIPLEXING

This application is a continuation of application Ser. No. 584,419 which was filed on Oct. 5, 1966 and which is now abandoned.

The present invention relates to electrical signalling systems and is more particularly concerned with systems operating on a frequency division multiplex basis, that is to say, systems having a number of information channels transmitted simultaneously over different frequency bands in the form of a complex signal. Where the main transmission channel is by way of a radio path and particularly where the transmitter itself may be in motion, for instance if it is located on a satellite, difficulties may be encountered in that Doppler shifts are liable to be produced which result in serious interchannel interference. This applies particularly where the available frequency band is limited.

A multichannel F.D.M. system which uses a common transmitter for all data channels and which is capable of achieving a very efficient use of bandwidth, while having a certain limited tolerance to Doppler shifts, is obtained by using for each data channel a phase modulated (PM) binary or quaternary coded signal together with a reference carrier. The reference carrier for each data channel may be a single unmodulated carrier at the center of the signal frequency band or alternatively may be one of the two PM data signals adjacent to the signal itself. The single unmodulated carrier is here used as the reference carrier for the two adjacent PM data signals. Each of these PM signals is used as the reference carrier for the next adjacent PM signal, and so on. The efficiency in the use of bandwidth obtainable with the system is due to the close frequency spacing which can be used between the adjacent signal carriers, without significant interchannel interference. This can be achieved so long as there is element synchronism between the different channels. Although the tolerance of this arrangement to Doppler shifts is no better than that of the equivalent multichannel F.D.M. system using simple frequency modulation for each data channel, a much more efficient use of bandwidth can be achieved due to the closer channel spacing which is possible. The frequency separation between adjacent PM signal carriers should be fixed at $f_m$c./s. (cycles per second), where $f_m$ bauds is the signal element rate of each data channel.

To detect a given data signal, the receiver isolates and demodulates the wanted PM signal and also its reference carrier, using two separate PM detectors. The phase change measured in the detector tuned to the reference carrier is subtracted from the phase change measured in the detector tuned to the wanted PM signal. Each PM signal is coded in terms of the change of phase, so that if a binary PM signal is used, the binary elements "0" and "1" are transmitted as phase changes in the carrier between successive elements, of 0° and 180° respectively. Alternatively, if a quaternary PM signal is used, the quaternary elements "0", "1", "2" and "3" are transmitted as phase changes of say 0°, 90°, 180°, and 270° respectively. When the reference carrier is an adjacent data signal, the phase changes applied to the carrier of a PM signal are the phase changes corresponding to the information to be transmitted in that channel, added to the phase changes applied to the reference carrier. The phase changes corresponding to the information transmitted are thus correctly detected at the receiver and at the same time the phase variations introduced in the transmission path are balanced out. Rapid positive or negative phase variations introduced in the transmission path, even if greater than 360°, will cancel out with this arrangement, so long as two conditions are satisfied. First the duration of any period in which the phase is in the process of changing must be short in comparison with the duration of a signal element, and second the phase variations produced in the reference carrier must always be substantially the same as those produced in the PM signal. In other words there must be negligible frequency selective fading over the signal frequency band.

Phase variations introduced by the transmission medium into the transmitted signal, as well as producing the phase errors which are cancelled out at the receiver by the additional detection of the reference carrier, also produce a certain degree of interchannel interference in both the detected data and the detected reference signals. These effects can be made very similar so that for practical purposes they cancel out when the detected reference signal is subtracted from the detected data signal, so long as neither the data nor the reference signal is ever the extreme high or low frequency signal transmitted. To reduce interchannel interference caused by Doppler shifts in the extreme high and low frequency PM signals, an additional unmodulated carrier must therefore be transmitted above the highest frequency PM signal and also below the lowest frequency PM signal, using a frequency spacing of $f_m$c./s. between the adjacent carriers in each case. For short-term Doppler shifts or rapid phase variations, the same interchannel interference is now produced in any detected data signal as in its detected reference signal, so that these interchannel interference effects are cancelled out in the final detection process at the receiver.

The timing signal needed to achieve optimum coherent or differentially coherent detection in either of the two PM detectors in any receiver, may be extracted from the whole of the received signal. Alternatively a much better arrangement is to use a separate transmitted timing signal which is in element synchronism with the data signals and which is of a type that can easily be isolated from these.

One weakness of the F.D.M. system just considered is its low tolerance to severe Doppler shifts. In common with any conventional F.D.M. system, this arrangement will experience serious interchannel interference where Doppler effects are such as to shift the received signal spectrum by an appreciable fraction of the frequency separation between adjacent channels and for a significant portion of the duration of a signal element.

The chief object of the present invention is to provide an improved signalling system which is largely immune from this kind of interference while still giving satisfactory performance as regards fading, that is to say, variations in amplitude and also making relatively efficient use of bandwidth.

According to the invention, a method of transmitting information on a frequency division multiplex basis, comprises the steps of generating a subcarrier for each channel, modulating each subcarrier with an information-bearing signal using a first type of modulation, generating a main carrier, and modulating the main carrier with all the subcarriers using a second type of modulation.

It follows from use of this method, that the actual signal transmitted is not appreciably affected by frequency shifts. The type of phase modulation as applied to the binary transmission of information can be that a 1 is represented by a change of phase between successive elements while an 0 is represented by no change. Alternatively it may be possible and more convenient in some circumstances to arrange that a 1 is represented by a particular phase relationship of the carrier to a reference carrier while a 0 is represented by a reversal of the carrier, that is to say a change of phase of 180°.

For convenience, the terms frequency modulation, amplitude modulation and phase modulation will hereinafter be abbreviated to FM, AM, and PM.

The basic arrangement is that the information in the different channels is modulated onto a number of subcarriers respectively, a different one being provided for each channel of information, and these phase modulated signals are then added together and used to amplitude—or frequency modulate a main carrier using both sidebands. The different subcarriers are harmonically related and if there is element synchronism between the different systems, saving of equipment particularly filters can be effected if the spacing between the different subcarriers has a value such that the number of cycles per second difference is equal to the signalling speed in bauds. At the receivers the signal is demodulated so as to produce an envelope of the main carrier signal and since it is only after this stage that frequency separation takes place, any frequency shift which may have occurred, for instance on a Doppler basis, will not appreciably affect the result in the first demodulation signal may then be separated into its components by known methods.

It has already been mentioned that some complication of the receiving equipment can be avoided if there is element synchronism between the different systems, but even in this case it is necessary to extract the basic repetition frequency at the receiving end. This may be done by applying the signal as a whole to a separate detector, or alternatively use may be made of a separate timing signal. This may take the place of the first information channel, that is to say the channel closest to the main carrier frequency, and a possible disadvantage of this arrangement is that it slightly increases the total bandwidth required. If this is a serious disadvantage and particularly if the number of information channels is comparatively small, it may be desirable to transmit the timing signal as a result of a further modulation. Thus the first modulation in every case is phase modulation, and if the second modulation for the transmission of the information is amplitude modulation, the timing signal may be transmitted by frequency modulation. Similarly if the information is transmitted by frequency modulation, the timing signal may be transmitted by amplitude modulation. As a further alternative the timing signal may be transmitted by regular phase modulation of the whole signal for instance every two elements.

A rather different approach to the problem is possible if the transmission is treated as a single sideband double modulation system for multichannel operation. This means that the total bandwidth required may be reduced to something like half compared with the double sideband arrangement, since different channels make use of frequencies on opposite sides of the main carrier as opposed to the arrangement previously suggested for double-sideband working in which each channel uses a frequency spectrum on both sides of the main carrier. In one form of such a system, the information over the channels using frequencies above the main carrier frequency is conveyed by the phase difference between the main carrier and the particular subcarrier concerned. For each of the information channels using frequencies below the main carrier, the reference for phase comparison purposes is the frequency in the spectrum the same number of cycles per second above of the main carrier as such channel is below the main carrier, and if the information is in binary form, for which purpose such a system offers considerable advantages, it may be arranged that for a 1 the secondary modulation is frequency modulation and for a 0 the secondary modulation is amplitude modulation.

The invention will be better understood from the following description of one form of this latter method of carrying it into effect, which should be taken in conjunction with the accompanying drawings in which:

FIG. 1 shows diagrammatically the basis on which the different forms of modulation operate;

Figure 2:
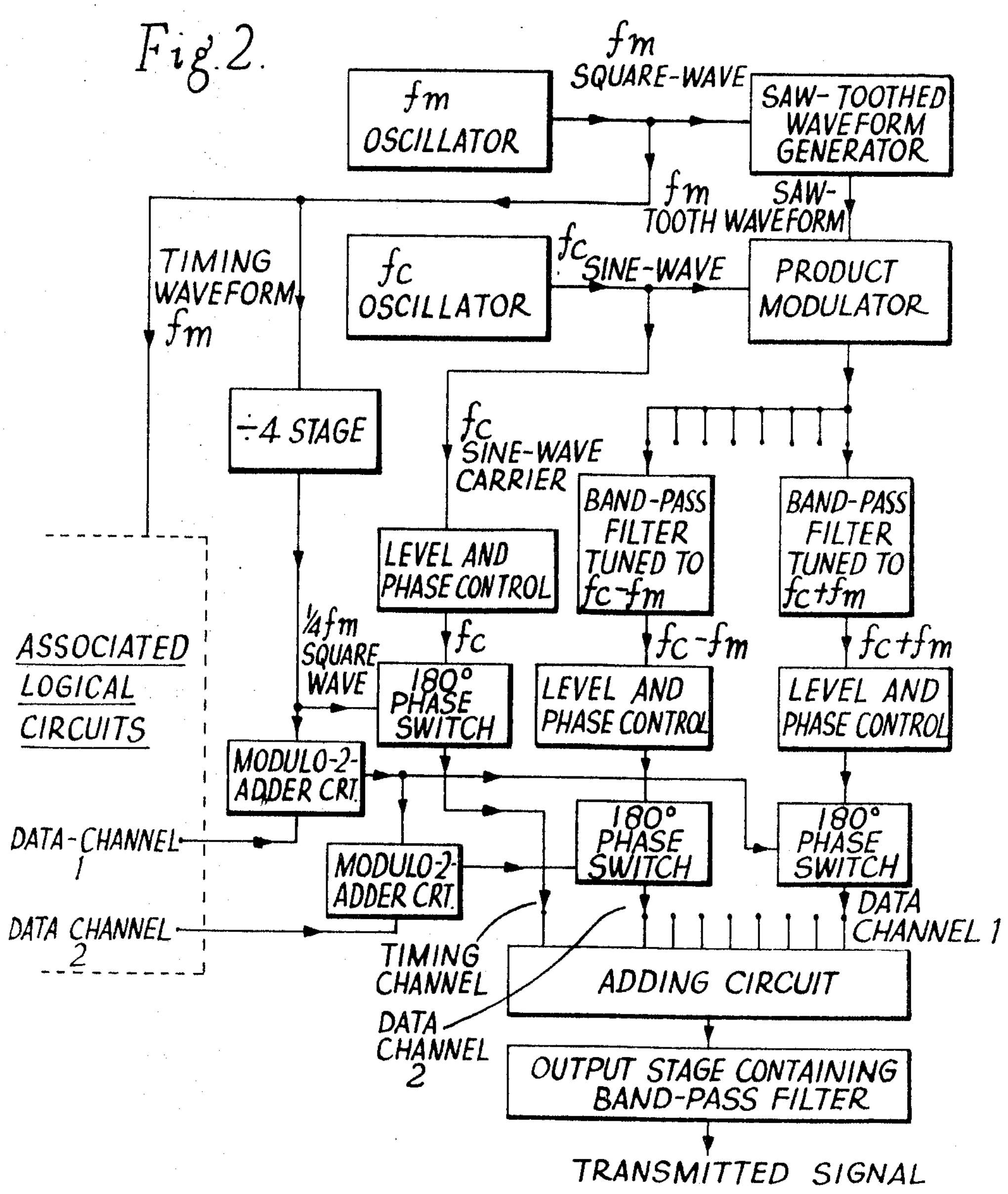
FIG. 2 is a block diagram of the basic method of operation of the transmitter.

An F.D.M. system having eight binary data channels will be assumed as a typical example of a system according to the invention. Each data channel contains a binary or quaternary coded PM signal, the frequency separation between the center frequencies of adjacent data channels being equal to $f_m$c./s., where the signal element rate of each channel is $f_m$ bauds. The center frequency of each of the two data channels immediately adjacent to the central carrier $f_c$ is separated from $f_c$ by $f_m$c./s., and not $2f_m$c./s. as would be necessary if there were a separate timing channel centered on the central carrier. Also the central carrier $f_c$, instead of being transmitted at the same level as that of each data signal, now has a voltage level about $n$ times greater than that of each data signal, where $n$ is the number of data channels. Synchronous transmission is assumed in every data channel, these being all in element synchronism with each other. Four data channels are spaced above the central carrier $f_c$ and the other four are spaced below. The timing signal is transmitted by phase modulating the whole of this signal with a binary square waveform. A signal pattern of alternated 1's and 0's is transmitted, where a 1 is represented as a 180° phase shift in the resultant carrier between adjacent signal elements and a 0 is represented as no phase shift between these elements. The timing signal is of course in element synchronism with the data signals.

The signal transmitted from the common transmitter is basically as follows. The timing signal is generated first as a simple binary PM signal using the central carrier $f_c$ itself. This transmits alternate 1 and 0 as previously described, so that the phase of the carrier $f_c$ is shifted by 180° at the end of every second element. The instantaneous frequency of the modulated carrier $f_c$ remains constant a $f_c$ over the whole of the timing waveform except at the instants of the phase inversions in the timing waveform. Furthermore, since there is very little band limiting applied to the timing signal, there is negligible amplitude modulation of the resultant modulated carrier. The value of a signal element in an odd-numbered data channel is determined solely by the phase of this data channel carrier relative to that of the central carrier $f_c$. The value of a signal element in an even-numbered data channel is determined solely by the phase of this data channel carrier relative to that of the carrier of the odd-numbered data channel which also has the same frequency separation from $f_c$.

In order to simplify the description of the F.D.M. system, only the two data channels immediately adjacent to the central carrier $f_c$ will be considered. The carrier frequency of the higher frequency channel is $f_1$c./s.$=(f_c+f_m)$c./s. and the carrier frequency of the lower frequency channel is $f_2$c./s.$=(f_c-f_m)$c./s. Binary-coded data channels are assumed.

Since each channel is assumed to be a synchronous system with an element rate of $f_m$ bauds and since element synchronism is used between all channels, the carrier $f_1$ of the higher frequency data channel will always gain in phase relative to the central carrier $f_c$ by exactly 360° or one complete cycle over the duration of each signal element. Similarly, over the same period the carrier $f_2$ of the lower frequency data channel will always be retarded in phase by exactly 360° or one complete cycle relative to the central carrier $f_c$.

If it is now assumed that at the start of each signal element, $f_1$ or $f_2$ is always either in phase or in antiphase with $f_c$, that is with a relative phase of 0° or 180°, then there are four different combinations of the two relative phases, giving four different resultant waveforms for the combined presence of the two corresponding signal elements. Two of these four waveforms may be used to represent the signal elements 0 and 1 in the higher frequency data channel, and the other two may be used to represent 0 and 1 in the lower frequency data channel. Furthermore it is very convenient here to arrange that the value of a binary element in the higher frequency channel is represented by the phase of $f_1$ relative to that of $f_c$, and that the value of a binary element in the lower frequency channel is represented by the phase of $f_2$ relative to that of $f_1$.

FIG. 1 shows the component parts of the four transmitted waveforms used to represent the different combinations of 0 and 1 in the coincident binary elements of the two data channels. In an F.D.M. system having eight data channels, the carriers of all data channels have equal levels and the voltage level of the central carrier $f_c$ is eight times greater than that of any of these. The magnitudes of the vectors in FIG. 1 are not therefore drawn to scale.

It can be seen from FIG. 1 that in the data channel 1, an element 0 is transmitted by a phase difference of 0° between $f_1$ and $f_c$ at the start of the signal element, and an element 1 is transmitted by a phase difference of 180° between these frequency components. In the data channel 2, an element 0 is transmitted by a phase difference of 0° between $f_2$ and $f_1$ at the start of the signal element, and an element 1 is transmitted by a phase difference of 180° between these frequency components. The resultant transmitted signal element is either a PM-AM or a PM-FM signal and the phase of the PM modulating waveform relative to the signal element boundaries is ±90°. In the data channel 1, an element 0 is represented by a phase lead of 90° of the PM modulating waveform relative to the signal element boundaries, whether the transmitted signal is PM-AM or PM-FM, and an element 1 is represented by a phase lag of 90°. In the data channel 2, an element 0 is represented by a PM-AM signal, whatever the phase of the PM modulating waveform, and an element 1 is represented by a PM-FM signal.

At the transmitter, not only must there be synchronous operation in every data channel as well as element synchronism between the different channels, but also the carriers of the data channels must each have the desired phase relative to that of the central carrier $f_c$, at the start of every signal element. It follows that in practice the carriers for the data channels must all be generated as subcarriers of the central carrier $f_c$, using a single oscillator whose output waveform suitably modulates $f_c$. In order to obtain the carriers of the eight data channels considered here, the output waveform from this oscillator must be suitably shaped to produce sufficient levels of the second, third and fourth harmonics, so that when this waveform modulates $f_c$, it produces all the required subcarriers. Since the frequency separation between adjacent channels in c./s. is equal to the signal element rate in bauds, the output waveform from this oscillator is also used to determine the signal element rate of all channels. With this arrangement, the required phase relationships between the different transmitted carriers can readily be achieved.

The timing information for all data channels is transmitted in a separate timing channel, using binary-coded phase modulation of the central carrier $f_c$ whereby the phase of the central carrier $f_c$ is shifted by 180° at the end of every second consecutive signal element. The information in the data channel 1 is transmitted as the phase of the carrier $f_1$ relative to that of $f_c$, and the information in data channel 2 is transmitted as the phase of the carrier $f_2$ relative to that of $f_1$. Similarly the information in data channel 3 is transmitted as the phase of the carrier $f_3$ relative to that of $f_c$, and the information in data channel 4 is transmitted as the phase of the carrier $f_4$ relative to that of $f_3$, and so on. It follows that the digital information actually transmitted in the data channel 1 is the information which is required to be transmitted in this channel added to that transmitted in the timing channel. Again, the digital information actually transmitted in the data channel 2 is the information which is required to be transmitted in this channel added to that transmitted in the data channel 1. Similarly the information transmitted in data channel 3 is the information which is required to be transmitted here, added to that transmitted in the timing channel and the information transmitted in data channel 4 is the information which is required to be transmitted here, added to that transmitted in data channel 3 and so on.

The transmitted timing signal itself is a sequence of alternate 1's and 0's where a 1 is represented as a 180° phase shift in the carrier between adjacent signal elements and a 0 is represented as no phase shift between these elements. However, as far as the odd-numbered data channels are concerned, the information in the timing channel is represented by the actual carrier phase of $f_c$. These data channels therefore treat the signal in the timing channel as the sequence 110011001100....., where a 0 is represented by a relative phase of 0° between the transmitted central carrier $f_c$ and the actual component of $f_c$ which is modulated at the transmitter to produce the carriers of the data channels, and a 1 is represented as a relative phase of 180° between these frequency components.

FIG. 2 shows the block diagram of one arrangement at the transmitter by means of which the required signals could be generated. The diagram shows only the timing channel and the data channels 1 and 2, but the arrangements required for the other data channels may readily by inferred from this diagram. It will be noted that apart from the modulator used to produce the subcarriers of the central carrier $f_c$, these being the carriers of the data channels, no process of linear modulation need be used. In fact a transmitted PM-AM or PM-FM signal is produced simply by inverting or not inverting the appropriate carriers at the start of the corresponding signal element.

Each 180° phase switch is a circuit which, when fed with a positive control signal representing a signal element 0, permits the input signal carrier to pass through without any change. When fed with a negative control signal, representing a signal element 1, the 180° phase switch inverts the input carrier, thus shifting its phase by 180°.

It can be seen from FIG. 2 that when the phase of the central carrier $f_c$ is shifted by 180° in response to a negative timing channel signal applied to the corresponding 180° phase switch, the same 180° phase shift is also added to any already imposed on the carriers $f_1$ and $f_2$ by the input signals for data channels 1 and 2. This is of course the arrangement used to generate the transmitted timing signal. Thus the timing signal never affects the phase relationships between $f_c$, and $f_1$ and $f_2$, and so it does not interfere with the data channels 1 and 2. Similarly whenever the transmitter input signal for data channel 1 is negative, representing an element 1, a 180° phase shift is added to any already imposed on the carriers $f_1$ and $f_2$. Thus the signal in data channel 1 never affects the phase relationship between $f_2$ and $f_1$, and so it does not interfere with the data channel 2. FIG. 1 shows the precise phase relationships used between $f_c$, $f_1$, and $f_2$ at the signal element boundaries and therefore the transmitted signal waveforms used to represent the different combinations of the signal element values in these two data channels.

One disadvantage of the arrangement for the transmitter shown in FIG. 2 is that in most applications of this system $f_m$ is very much smaller than $f_c$. Under these conditions the band-pass filters needed to isolate the frequency components $f_c+f_m$, $f_c-f_m$, $f_c+2f_m$ and so on, can become very complex or costly, and at the same time a very stable oscillator is required to generate $f_c$. The arrangement for the transmitter shown in FIG. 3 overcomes this disadvantage, because the different frequency components which must here be isolated from each other are the modulating frequencies $f_m$, $2f_m$ and so on. These frequencies are harmonically related, so that the isolation of each frequency from the others can be achieved with relatively simple circuits. Although the rest of the transmitter circuit is here somewhat more complex than that in FIG. 2, this would in most applications be considerably more than offset by the much more complex or costly band-pass filters required in FIG. 2 and in addition a simpler oscillator circuit can be used in FIG. 3 to generate $f_c$. For this reason the transmitter design shown in FIG. 3 would normally be the preferred system.

Figure 3:
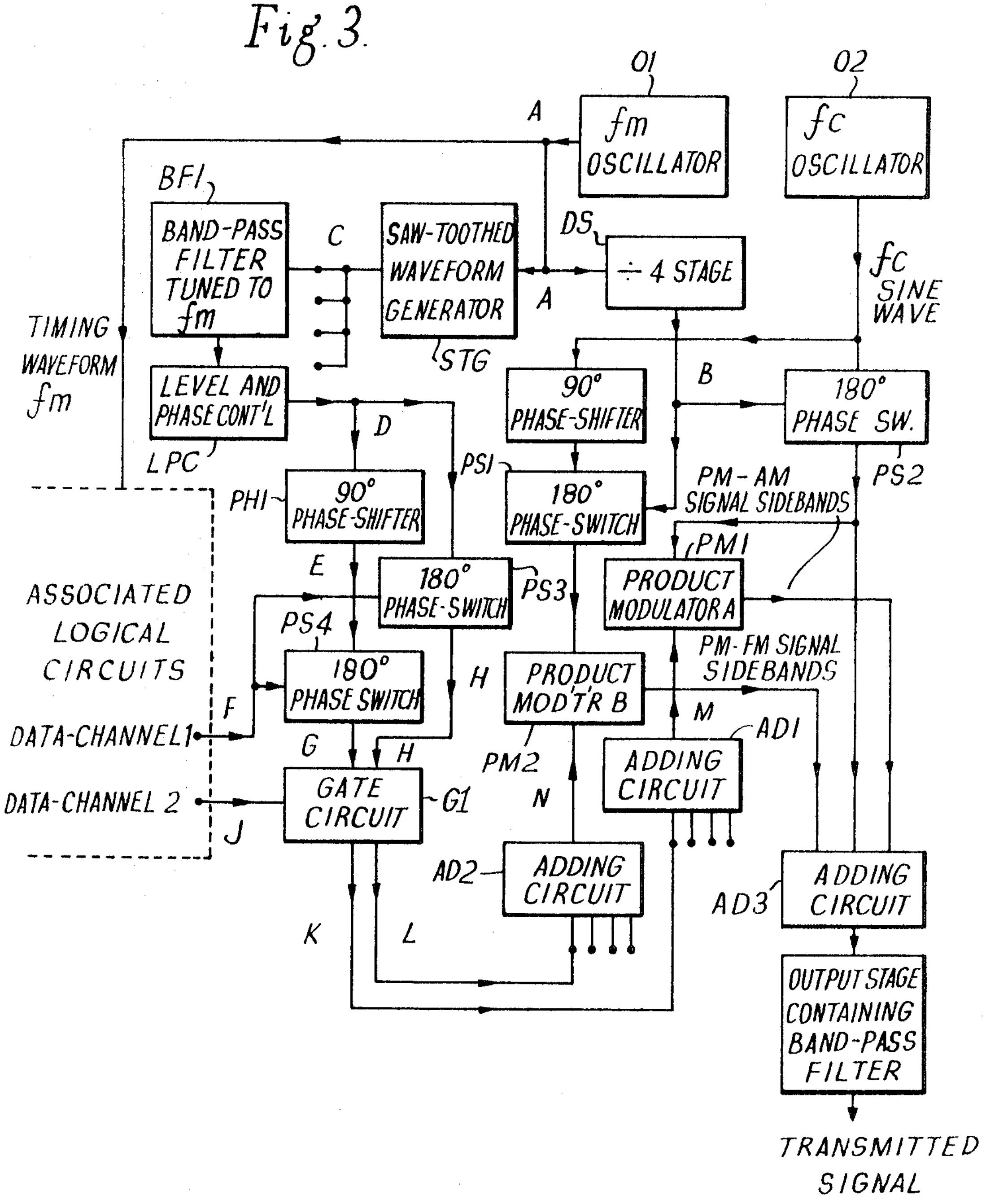
FIG. 3 is a similar block diagram of a modified form of transmitter which gives certain advantages in practice.
Figure 4:
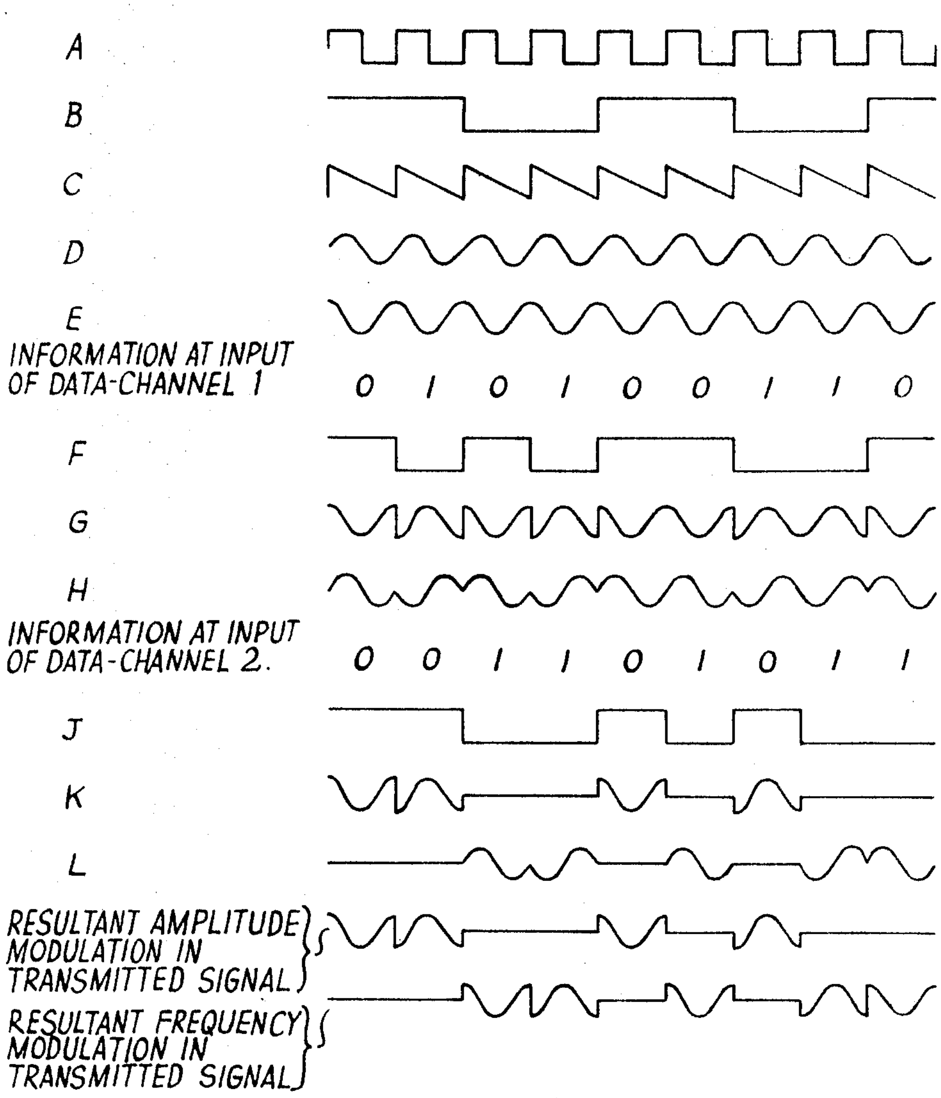
FIG. 4 shows waveforms in various parts of the equipment of FIG. 3.

The waveforms obtained at different points in the transmitter circuit of FIG. 3 are shown in FIG. 4, and the method of operation of this circuit is as follows. The square-wave signal produced by the $f_m$c./s. oscillator 01 at the terminal A is used as the timing waveform which is fed to the associated logical circuits LC. The input signals to the transmitter for the different data channels are synchronized to this timing waveform, so that the transitions in any of these input square-wave signals are always coincident with the corresponding rising edges of the timing waveform at terminal A. The 4 stage DS converts the fundamental frequency of the timing waveform to one quarter of its value, that is ¼$f_m$c./s., giving the waveform at the terminal B. This signal operates each of the two associated 180° phase switches PS1 and PS2 as follows. While the signal is positive, the input sine wave carrier $f_c$ passes through without change, and while the signal is negative the phase of the carrier $f_c$ is shifted by 180°. The output signal from the 180° phase switch PS2 fed directly from the $f_c$c./s. oscillator 02 is the phase-modulated central carrier which contains the transmitted timing signal.

The saw-toothed waveform generator STG converts the timing signal at terminal A into a saw-toothed waveform having the same fundamental frequency. This waveform, at terminal C, contains a range of harmonically related frequencies including the components $f_m$, $2f_m$, $3f_m$ and $4f_m$c./s., each of which is isolated from the others in a separate band-pass filter such as BF1. Since FIG. 3 shows only the data channels 1 and 2, only the band-pass filter BF1 tuned to $f_m$c./s. is given here. The block diagram of the band-pass filter and of the following circuits for each of the remaining pairs of data channels is similar to that shown in FIG. 3 for the data channels 1 and 2.

The band-pass filter BF1 tuned to $f_m$c./s. extracts the fundamental frequency component $f_m$c./s. from the saw-toothed waveform, and this signal after being processed in the level and phase control LPC, provides the sine wave of frequency $f_m$c./s. at terminal D. This waveform is advanced in phase by 90° in the 90° phase shifter PH1 to give the sine wave at E. The two sine waves D and E are fed to the corresponding 180° phase switches PS3 and PS4. The phase of each sine wave is here shifted by 180° when the input signal for data channel 1 is negative and represents a 1, or its phase is left unchanged when the input signal for data channel 1 is positive and represents a 0. The output signals from the two 180° phase switches, at the terminals G and H, are binary PM signals, having one complete cycle of the carrier $f_m$c./s. per signal element. Each of these PM signals therefore contains the information of the data channel 1 coded in terms of the carrier phase.

The input signal for data channel 2 is fed to the gate circuit G1 where it controls the connections between the terminals G and H and the terminals K and L respectively. The design of the gate circuit is such that either terminal G may be connected to terminal K or terminal H may be connected to terminal L. When the input signal for data channel 2 is negative and represents a 1, H is connected to L and G is disconnected from K. When the input signal for data channel 2 is positive and represents a 0, G is connected to K and H is disconnected from L.

The waveform at the terminal K or L is fed via the associated adding circuit AD1 or AD2 to the terminal M or N respectively, where it is used to modulate the central carrier $F_c$ in the associated product modulator PM1 or PM2. The waveform at each of the terminals M and N is the sum of the corresponding waveforms belonging to the data channels 1 and 2, 3 and 4, 5 and 6, 7 and 8. The circuits of the data channels 3 to 8, feeding the adding circuits, are not shown in FIG. 3 and the circuits for any of these pairs of data channels are similar to those shown for the data channels 1 and 2.

The carrier $f_c$ fed to the product modulator PM1 is the same as the transmitted central carrier, and the carrier $f_c$ fed to the product modulator PM2 always leads the transmitted central carrier by a phase angle of 90°. The transmitted central carrier is phase modulated so that its phase is shifted by 180° at the end of every second consecutive signal element. Since the phase change applied to $f_c$ is instantaneous and since it always occurs at the boundary between two adjacent elements, the frequency of the transmitted central carrier remains constant at $f_c$c./s. over the whole duration of each signal element. The fact that this carrier is phase modulated does not therefore affect its modulation in either product modulator over the duration of any signal element. The output signal from each product modulator is proportional to the product of the input carrier and modulating waveform, so that when no modulating waveform is applied to one of these, it produces no output signal. Each product modulator is in fact a suppressed carrier amplitude modulator giving upper and lower sideband signals but no carrier. In the case of the product modulator PM1, the input carrier $f_c$ is always in phase with the transmitted central carrier. Thus the resultant signal formed by adding the output from the product modulator PM1 to the transmitted central carrier, is either one or more PM-AM signals, when one or more PM signals are present at the terminal M, or when no signal is present at the terminal M, the resultant signal contains only the central carrier. In the case of the product modulator PM2, the input carrier $f_c$ is always at a phase angle of +90° with respect to the transmitted central carrier. Thus the resultant signal formed by adding the output from the product modulator PM2 to the transmitted central carrier is either one or more PM-FM signals, when one or more PM signals are present at the terminal N, or when no signal is present at the terminal N, the resultant signal contains only the central carrier.

The final transmitted signal is formed by adding the output signals from the product modulators PM1 and PM2 to the central carrier in the adding circuit AD3. The phase modulation applied to the central carrier itself and therefore also to all the upper and lower sideband components, carries the transmitted timing signal. the output signals from the product modulators PM1 and PM2 when transmitted together with the central carrier also contain the transmitted signals for the data channels 1 to 8. Thus for instance, when the input signal for data channel 1 is negative and represents a 1, the carrier of the corresponding PM signal, used either to amplitude—or frequency modulate the central carrier in the transmitted signal, is at a phase angle of −90° with respect to the signal element boundaries. When the input signal for data channel 1 is positive and represents a 0, the carrier of the PM signal is at a phase angle of +90°. When the input signal for data channel 2 is negative and represents a 1, the corresponding PM signal is used to frequency modulate the central carrier in the transmitted signal, and when the input signal for data channel 2 is positive and represents a 0, this PM signal is used to amplitude modulate the central carrier. The nature of the transmitted signal is in fact exactly as shown in FIG. 1.

Figure 5:
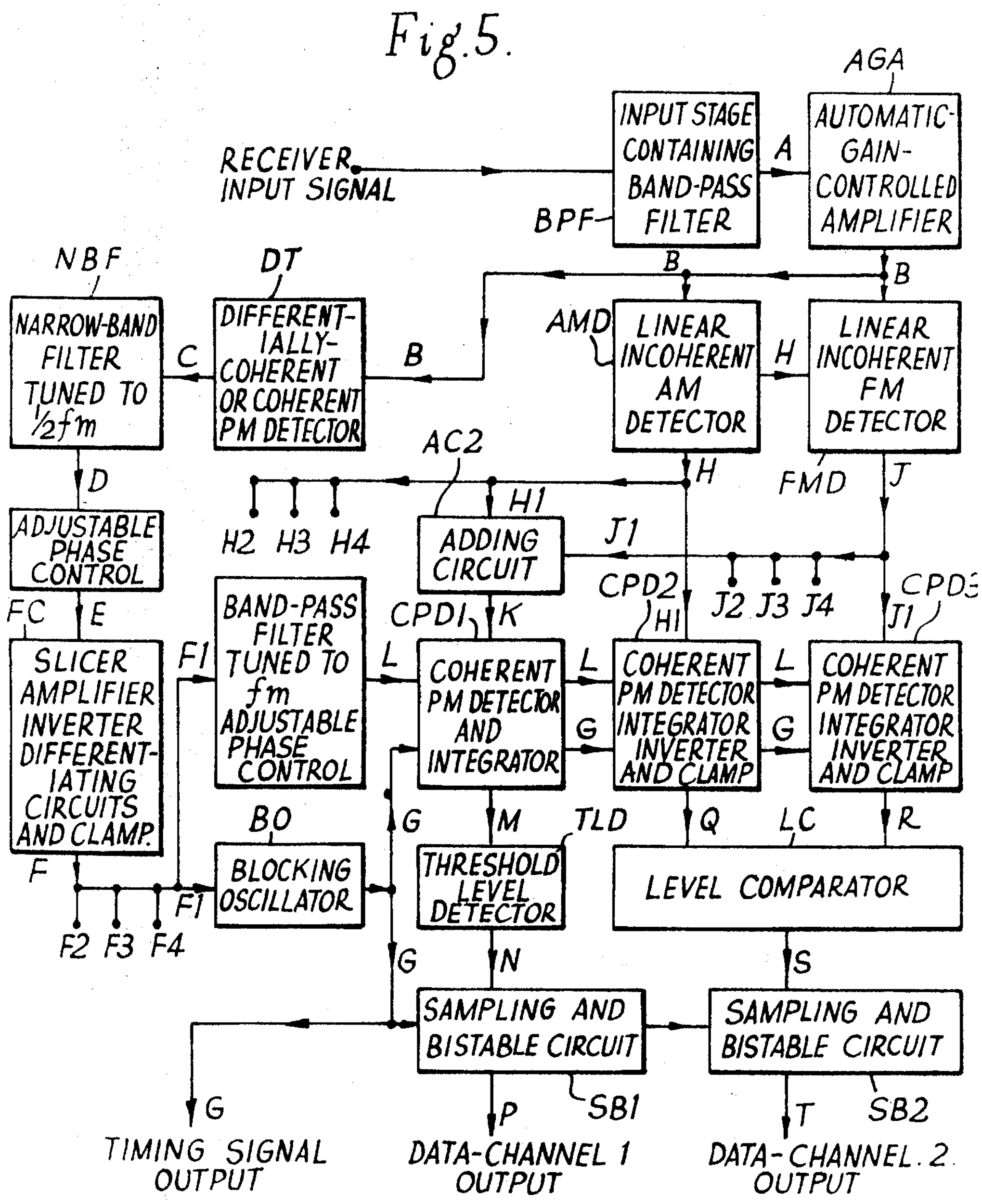
FIG. 5 is a block diagram of the equipment at a receiver for two of the data channels.
Figure 6:
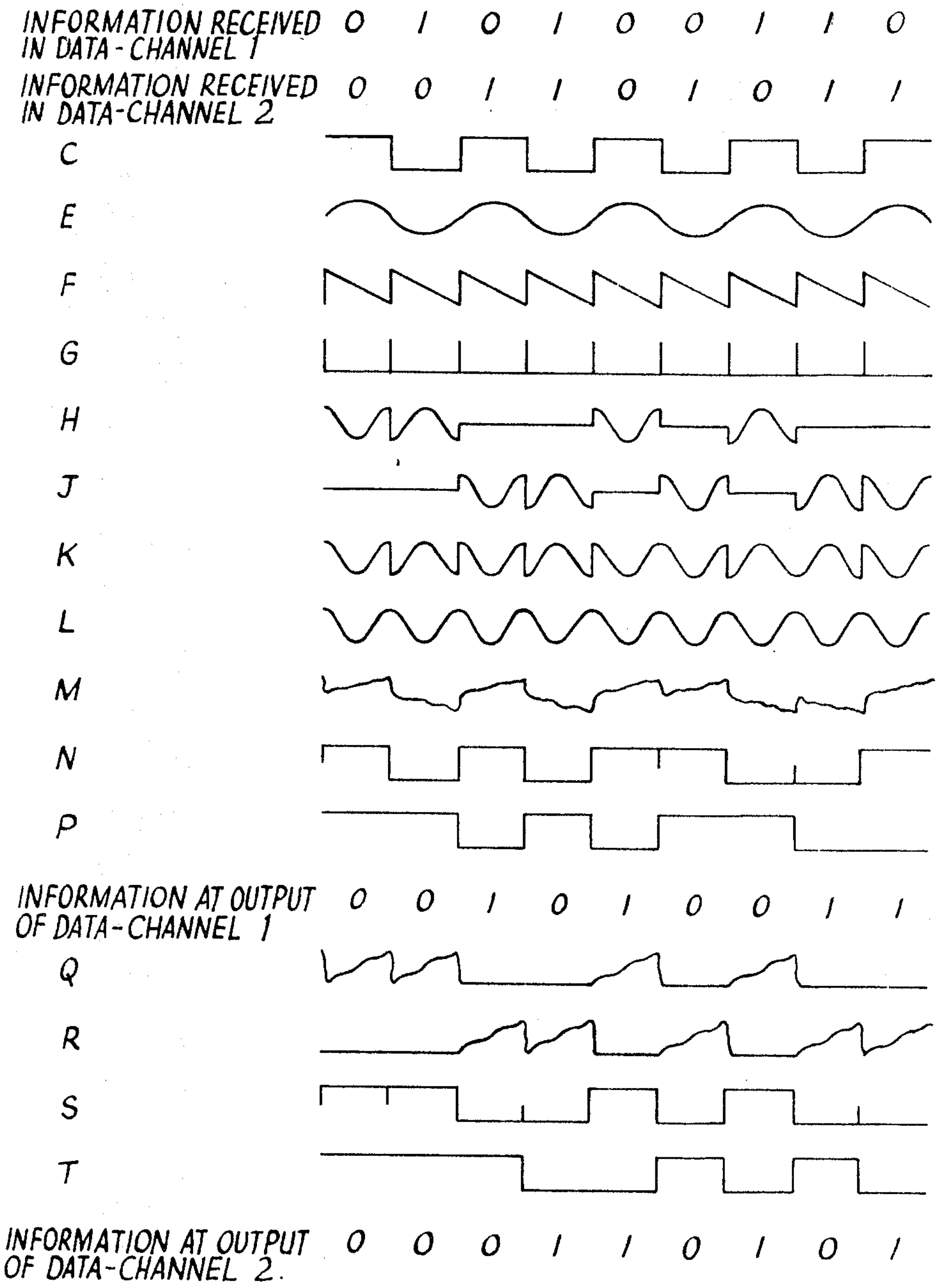
FIG. 6 shows waveforms in various parts of the equipment of FIG. 5.

The design of the receiver needed to demodulate the transmitted signal is basically the reverse of the method just described for generating the signal. The block diagram of a suitable receiver and the waveforms obtained at different points in this diagram are shown in FIGS. 5 and 6 respectively. For the sake of completeness the receiver described here is one capable of detecting all eight of the data channels which are transmitted from the common transmitter. Where the different data channels are transmitted to separate receivers, usually in different locations, each receiver comprises only the appropriate portion of the complete receiver considered here. In FIG. 6 the delays in certain of the receiver circuits have been neglected so as to simplify a little the description of the receiver. These changes in no way affect the method of operation, and this will now be described in some detail.

The received signal is first filtered in a band-pass filter BPF1 which removes noise frequency components outside the signal frequency band. The signal is then amplified in an automatic gain controlled amplifier AGA, whose output signal is fed to the detector DT for the timing signal and also to an AM detector AM and an FM detector FMD.

The timing signal is preferably detected by means of a detector which uses a delay of one element and compares the carrier phases in the original and delayed signals, i.e. what is known as a differentially coherent detector. The comparison between these two signals is carried out after they have been sliced in an amplifier limiter in order to eliminate as far as possible the amplitude modulation of the received signal. Each of the resultant signals contains the carrier $f_c$, which undergoes regular phase shifts of 180° at intervals of two signal elements and which also contains smaller phase shifts of up to about 40°, whose frequency is much higher and whose average value over the duration of any one element is always zero. The original and delayed signals after these have been sliced and amplified in the amplifier limiters, are compared in a standard modulo-2-adder circuit, to give the output signal at terminal C. This signal is positive when the two sliced signals are the same and negative when these are inverted with respect to each other. The output signal at terminal C is thus a square-wave signal having a fundamental frequency of $\frac{1}{2}f_m$c./s. and having also a large number of fine irregularities (not shown in FIG. 6).

The arrangement just described assumes that there are a whole number of half cycles of the carrier $f_c$, with at least one complete cycle per signal element. Where this is not so, the delay used in the detector must be reduced below the duration of one element until its value satisfies this condition. Where there is a very large number of carrier cycles per signal element, the differentially coherent detector requires an extremely accurate and stable value of delay and it may therefore involve rather complex equipment. Under these conditions it is preferable to use what is described as coherent detection instead of differentially coherent detection. For this, the input signal to the detector is first sliced and amplified in an amplifier limiter. A square wave signal with a fundamental frequency $f_c$c./s. and in phase with the carrier of one or other of the two different binary elements received is extracted form the sliced and amplified signal, and is used as the phase reference in the coherent detector. A modulo-2-adder circuit should be used here to demodulate the sliced and amplified input signal, using this signal and the phase reference as the two input waveforms to the modulo-2-adder circuit. The output signal from this circuit is a square-wave signal with a fundamental frequency of $\frac{1}{4}f_m$c./s. The fundamental frequency of the square wave must therefore be doubled to $\frac{1}{2}f_m$c./s., before feeding it to terminal C. The time constant of the phase of the reference square-wave signal which is used to achieve coherent detection must be kept as short as possible consistent with correct detection.

In order to remove as far as possible the various distortion effects in the waveform at terminal C, this waveform is passed through a narrow band filter NBF tuned to $\frac{1}{2}f_m$c./s. The filter extracts the fundamental frequency component of the input waveform, the phase of the resultant sine wave at terminal D being at any instant determined by the average phase of the input square-wave signal, over a fixed preceding period of time. The narrower the bandwidth of the filter, the longer the effective averaging or integration period and the less the effect of any short-term phase variations which are introduced in the transmission path.

Where the detector DT uses coherent detection, a preferable arrangement would probably be to use the square-wave signal with the fundamental frequency of $\frac{1}{4}f_m$c./s. at the output of the coherent detector without frequency doubling this signal here. The narrow band filter NBF is now tuned to $\frac{1}{4}f_m$ c./s. instead of $\frac{1}{2}f_m$c./s., and the resultant $\frac{1}{4}f_m$c./s. sine wave at the terminal D is frequency doubled before being processed in the following circuits.

A better tolerance to the temporary loss of the received signal may be obtained by the use of a suitable phase-locked oscillator in place of the simple narrow band filter, and this is the preferred arrangement where the temporary loss of signal is liable to occur frequently. A phase-locked oscillator would therefore normally be used in most practical applications of this system. Although basically more complex, the essential function of the phase-locked oscillator, as with the narrow band filter, is to determine the average phase of the signal at terminal C over a fixed preceding period of time. The use of a simple narrow band filter has been shown in FIG. 5, rather than the use of a phase-locked oscillator, because it illustrates more clearly the basic function of the circuit.

Since a considerable degree of integration can be applied in the narrow band filter or phase-locked oscillator, the sine wave signal at the terminal D and all the waveforms directly derived from this signal are only slightly affected by phase variations introduced in the transmission path, or by short-term Doppler shifts, however severe these may be. Accordingly there is no particular disadvantage in using a simple PM signal in the timing channel, and both the detected timing signal at terminal G and the reference sine wave signal at terminal L should be only slightly affected by the amplitude and frequency modulation effects normally experienced in the transmission path.

The phase of the sine wave signal at terminal D is adjusted to its required value by means of the adjustable phase control PC and the resultant sine wave at terminal E is now processed in the following circuits FC, which use conventional techniques, to give the saw-toothed waveform at terminal F. This waveform is used to trigger the blocking oscillator BO whose output signal at terminal G contains short positive-going pulses. The leading edges of the timing signal at terminal G coincide with the steep rising edges of the saw-toothed waveform.

The remaining part of the receiver block diagram, as shown in FIG. 5, is concerned with the detection of the signals in the data channels 1 and 2. The detectors for the data channels 3 and 4, 5 and 6, 7 and 8, are in each case the same and are not shown here.

As already mentioned, the received signals at the output of the automatic gain controller amplifier AGA are fed both to an AM detector AMD and also to an FM detector FMD. Each of these detectors extracts the respective modulating waveform by means of an incoherent detection process, and the detected modulating waveform in each case contains the sum of the corresponding modulating signals of the different data channels. For this reason it is clearly important to use linear AM and FM detectors in order to reduce as far as possible any interchannel interference caused by intermodulation effects. The phase modulation applied to the central carrier $f_c$ in the timing signal produces negligible amplitude or frequency modulation of the resultant transmitted signal so long as excessive band limiting is not applied to this signal. The interchannel interference introduced into the data channels by the timing signal should therefore be negligible under these conditions, just so long as the AM and FM detectors are truly incoherent.

The AM detector AMD is of a conventional type and contains a full wave rectifier followed by a low-pass filter. The FM detector FMD is somewhat more complex and is shown in more detail in FIG. 7, the additional complexity being mainly caused by the need to eliminate the interchannel interference in the output signal of the FM discriminator. The interchannel interference originates from the transmitted PM-AM signals and it is caused by the basic method used for generating the transmitted signal.

In the following expressions for $f(t)$, the constants of proportionality have been omitted for the sake of simplicity.

The basic detected signal in the FM detector is given by $$f(t)=\times d\Phi/dt$$

so that it is proportional not only to the instantaneous carrier frequency $d\Phi/dt$ of the received signal, but also to the amplitude $R$ of this signal. It is essential for the correct operation of the receiver that the basic detected signal has this particular relationship with the received signal. In an F.D.M. system having more than two data channels there will often be considerable distortion in the basic detected signal caused by interchannel interference from the transmitted PM-AM signals. This interference is cancelled out by adding to the basic detected signal the correction signal given by $$f(t)=dr/dt$$

The resultant detected signal should contain only negligible interchannel interference and is given by $$f(t)=R\times d\Phi/dt+\Phi dR/dt=d/dt(R\times\Phi)$$

$\Phi$ is the phase variation of the received signal carrier from its mean value. Thus $d\Phi/dt$ is in fact the instantaneous frequency difference between the received signal carrier and its mean frequency $f_c$ cycle per second.

The FM discriminator FM can be of any conventional type which has a linear frequency characteristic and achieves truly incoherent detection of the input signal. Its output signal must be unaffected by the input level, which normally implies that the input signal to the discriminator is sliced before being detected. The two product modulators PM1 and PM2 can be of any type which achieves multiplication between two input analog waveforms. The differentiator D and integrator I are simple networks of conventional design.

The deemphasis network DN has an attenuation which increases linearly with frequency over the frequency range $\frac{1}{2}f_m$ c./s. to $4\frac{1}{2}f_m$c./s. and is arranged so that the levels of the different PM signals at the output of the FM detector are all adjusted to the same value. In the absence of this network, the PM signal with the carrier frequency $2f_m$c./s. would have twice the voltage level at the output of the FM detector compared with the PM signal with the carrier frequency $f_m$c./s. The PM signal with the carrier frequency $3f_m$c./s. would have three times this level, and so on. At the output of the AM detector, all PM signals have the same level, and this is the same as that of the PM signals at the final output of the FM detector.

Figure 7:
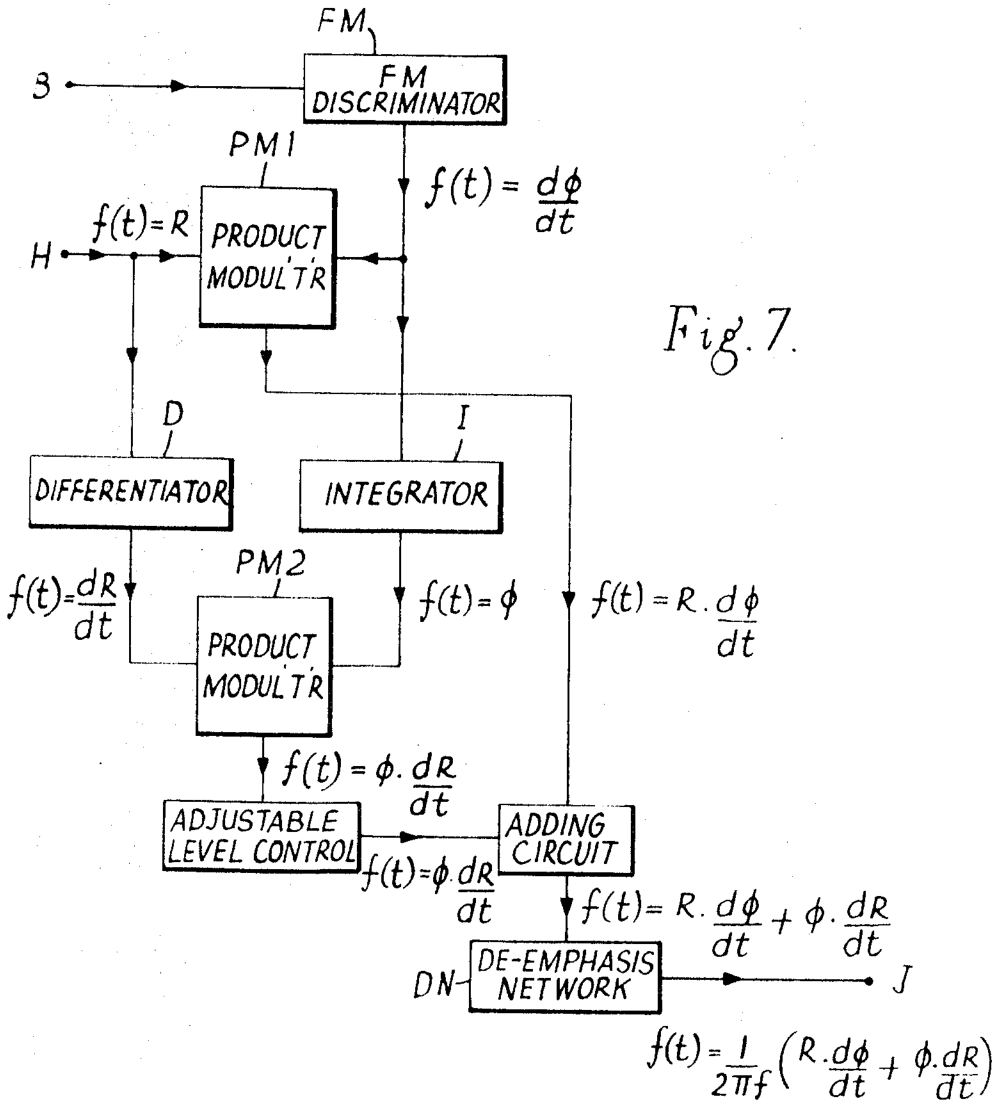
FIG. 7 shows a more detailed block diagram of the FM detector shown in FIG. 5.

In order to obtain the greatest possible similarity between the PM signals at the output of the FM detector and those at the output of the AM detector, the response of the deemphasis network above $4\frac{1}{2}f_m$c./s. must be arranged in conjunction with the attenuation characteristics of the postdetection low-pass filter in the AM detector AMD of FIG. 5 and of the post-detection low-pass filter in the FM discriminator FM of FIG. 7 so that there is in each case the same attenuation of the detected signal at any one frequency. The detected signals will normally be band limited, so that instead of the rapid transitions between adjacent elements of different values, as shown in FIG. 6 for the waveforms at the terminals H and J, these transitions will normally be somewhat rounded.

The output signals shown in FIG. 6 for the AM and FM detectors AMD and FMD at the terminals H and J respectively are those for the data channels 1 and 2 only. The signals for the other data channels, which would normally be superimposed on the signals shown, are omitted in order to clarify the description. Furthermore, the output signals from the AM and FM detectors, in addition to being processed in the circuits which give the final detected output signals for the data channels 1 and 2, as outlined in FIG. 5, are also fed to the terminals H2, H3, H4 and J2, J3 and J4 respectively, from where they are fed to circuits similar to those indicated, which give the final detected output signals for the data channels 3 and 4, 5 and 6, 7 and 8.

The signals at H and J are added together in the adding circuit AC to give the signal at K which is a simple binary PM signal. As just mentioned the output signals from the AM and FM detectors are arranged to have the same levels, so that an undistorted binary PM signal is obtained at K. To achieve this under all conditions, the FM detector must be of the type where the output signal level is linearly proportional to the input level, so that a change in the input signal level to the AM and FM detectors produces in each case the same change in output level.

The PM signal of the data channels 1 and 2, at the terminal K, is isolated from the PM signals of the other data channels at the terminal K and at the same time it is also demodulated, by means of the coherent PM detector CPD1. The reference signal needed to achieve coherent detection is extracted from the saw-toothed timing signal at terminal F, using a band-pass filter BPF2 tuned to $f_m$c./s. followed by an adjustable phase control. The reference signal at terminal L is a sine wave signal having a frequency of $f_m$c./s. and the same phase with respect to the signal element boundaries as that of the PM modulating signal corresponding to an element 0 in the data channel 1. Thus the timing channel not only carries the required timing information but also the carrier phase information needed to achieve coherent detection of the PM modulating signal. The reference signals needed to achieve coherent detection in the pairs of data channels 3 and 4, 5 and 6, 7 and 8 are extracted from the saw-toothed waveform at the terminals F2, F3 and F4 respectively. The frequencies of the reference sine wave signals are here $2f_m$, $3f_m$ and $4f_m$c./s. respectively, and in each case the phase of the reference signal is adjusted to be the same as that of the PM modulating signal corresponding to an element 0.

The coherent PM detector for any one of the pairs of data channels 1 and 2, 3 and 4, 5 and 6, 7 and 8, can completely isolate the wanted PM signal from the others, since the other PM signals always give zero output from the coherent PM detector at the end of the detection period for a signal element. This occurs here because each of the different carrier frequencies $f_m$, $2f_m$, $3f_m$ and $4f_m$c./s. used for the PM signals has a different whole number of cycles per signal element, so that over the detection period for each element in the coherent detector tuned to one of these frequencies, the contributions of any one of the other carrier frequencies always cancel out.

Since the PM signals at the terminal K corresponding to the different pairs of data channels are derived from the outputs of the linear AM and FM detectors AMD and FMD, and since these signals therefore correspond to the modulating waveforms of the transmitted signal carrier $f_c$, the phases of the different PM signals relative to the signal element boundaries are not significantly affected by the amplitude and frequency modulation effects normally experienced in transmission. It is for this reason that the PM signals can carry information in terms of the carrier phase with respect to the signal element boundaries, and they need not carry information in terms of the change of phase between adjacent signal elements. More efficient use of the available information is therefore obtained.

The wanted PM signal at the terminal K, after being isolated from the other PM signals and demodulated in the coherent PM detector CPD1, is now integrated in an integrating circuit whose output signals is reset to zero at the beginning of the detection of each signal element. The timing signal at G is used to reset the integrating circuit. Thus at the end of the detection period of each signal element, the output signal of the integrator, at terminal M, is a measure of the degree to which the detected PM signal was more nearly like an element 0 or an element 1. The integrator output signal is now sliced in a threshold level detector TLD. This is a slicing circuit which determines whether the output signal from the integrator is positive or negative with respect to its zero or reference level, to which it is reset at the beginning of each detection period. If the phase of the input PM signal corresponds more nearly to that of an element 0, then the output signal from the threshold level detector is positive at the end of the detection period. If the phase of the input PM signal corresponds more nearly to that of an element 1, then the output signal at the end of the detection period is negative. The phase of the input PM signal of course carries the information for the data channel 1.

The fact that the waveforms at the terminals H and J contain not only the signals for the data channels 1 and 2, which have been considered here, but also for those for the other six data channels, means that the waveforms obtained at the terminals M and N will not be exactly as indicated in FIG. 6 because of the influence of the other signals. The effect of these signals on the waveforms at M and N, at the end of the detection period for each element, will however always be zero, for the reasons previously explained. Since the waveform at N is only sampled at the end of each detection period, the presence of the small error signals in the other portions of the waveforms at M and N has therefore no effect on the correct operation of the system.

The output signal from the threshold level detector at the terminal N is fed to a sampling and bistable circuit SB1 which samples the signal at the end of the detection period for each signal element. The rising edge of each positive pulse in the timing waveform at G is used to sample the threshold level detector output signal, and the sampling operation is completed before the output signal begins to be reset. At each sampling operation, the timing signal at G sets the bistable circuit into the appropriate stable state, where it remains until the next positive pulse in the timing signal. A positive voltage at N at the sampling instant causes the voltage at P to be set positive at this instant and a negative voltage at N at the sampling instant causes the voltage at P to be set negative. The output voltage from this bistable circuit is the receiver output signal for the data channel 1, a positive level here representing 0 and a negative level 1.

The output signals from the AM and FM detectors AMD and FMD at the terminals H and J respectively are also each fed to the respective coherent PM detector, integrator, inverter and clamp circuits represented by the blocks CPD2 and CPD3. The function of the coherent detector and integrating circuit here is exactly as previously described for the other coherent PM detector and integrator CPD1. Thus each of the two detectors isolates the wanted PM signal from the others and demodulates this signal. In each case, the detected and integrated signal is now inverted and the original and inverted signals are clamped to remove the negative-going pulses. The resultant two signals, containing only the positive-going pulses, are added together to give the output signal at the terminal Q or R. Over the duration of every signal element, each of the signals at Q and R corresponds to the integration from the start of that element, of the square of the voltage or current of the wanted PM signal. The carrier frequency of this signal is $f_m$c./s. and it is either in phase or in antiphase with the reference sine wave at L. At the end of every signal element, each of the two circuits therefore measures the total energy of the wanted PM signal carrier in either of its two correct phases. Over an element where the receiver input signal for the data channels 1 and 2 is a PM-AM signal, the signal at the terminal Q is a positive-going pulse, indicating that a sine wave carrier of frequency $f_m$c./s. and with either of the two correct phases, is obtained at the output of the AM detector. The signal at the terminal R however remains at zero, indicating that no sine wave carrier of frequency $f_m$c./s. is obtained at the output of the FM detector. Over an element where the receiver input signal for the data channels 1 and 2 is a PM-FM signal, there is no signal at the terminal Q and a positive pulse at terminal R. The signals at Q and R are compared in the level comparator LC, which at any instant gives a positive output signal at S when the signal at Q is more positive than that at R, and a negative output when the signal at R is more positive than that at Q. At the end of the detection period for each element the level comparator therefore determines whether the wanted PM signal was transmitted as amplitude or frequency modulation of the central carrier $f_c$, in other words whether a signal element 0 or 1 was transmitted in the data channel 2.

The fact that the waveforms at the terminals H and J contain only on the signals for the data channels 1 and 2 which have been considered here, but also those for the other six data channels, means that the waveforms obtained at the terminals Q, R and S will not be exactly as indicated because of the influence of the other signals. The effect of these signals on the waveforms at Q, R and S at the end of the detection period for each element will however always be zero, for the reasons previously explained. Since the waveform at S is only sampled at the end of each detection period, the presence of the small error signals in the other portions of the waveforms at Q, R and S has therefore no effect on the correct operation of the system.

The output signal from the level comparator, at the terminal S, is fed to a sampling and bistable circuit SB2. This samples the signal at the end of the detection period for each signal element. The rising edge of each positive pulse in the timing waveform at G is used to sample the level comparator output signal, and the sampling operation is completed before the output signal begins to be reset. At each sampling operation, the timing signal at G sets the bistable circuit SB2 into the appropriate stable state, where it remains until the next positive pulse in the timing signal. A positive voltage at S at the sampling instant causes the voltage at T to be set positive at this instant, and a negative voltage at S at the sampling instant causes the voltage at T to be set negative. The output voltage from this bistable circuit is the receiver output signal for the data channel 2, a positive level here representing 0 and a negative level 1.

In order to obtain the most accurate discrimination between the two possible modulation methods which may be used for any element in data channel 2, it is important that the same signal level should always be obtained at the output of the AM detector when an element is transmitted as a PM-AM signal, as is obtained at the output of the FM detector when an element is transmitted as a PM-FM signal. To achieve this under all conditions, the FM detector must be of the type whose output signal level is linearly proportional to the input level, so that a change in the input signal level to the AM and FM detectors produces in each case the same change in output level. The more accurately this can be achieved and the more sensitive and stable the action of the level comparator, the better the tolerance which is obtained in the even-numbered data channels in the receiver to large and sudden level changes in the received signal such as accompany severe fading effects in the transmission path. To obtain the best tolerance of the odd-numbered data channels in the receiver to large and sudden level changes in the received signal, not only should the FM detector be of the type just described but also the threshold level detector should be as sensitive and stable as possible.

I claim:

1. A method of transmitting information on a frequency division multiplex basis, the data channels being grouped in pairs comprising the steps of generating a first main carrier; generating a second main carrier having the same frequency as the first main carrier but shifted in phase by 90° with respect to the said first main carrier; generating a first subcarrier for each pair of channels, generating a second subcarrier for each pair of channels having the same frequency as the first subcarrier but shifted in phase by 90° with respect to the first subcarrier, modulating the first and second subcarriers of each pair of channels with a first information bearing signal in the first channel of said pair of channels; modulating either said first main carrier with said first modulated subcarrier or said second main carrier with said second modulated subcarrier in accordance with a second information bearing signal in the second channel of said pair of channels and combining said main carriers to form a single transmitted signal.

2. A method of transmitting information as claimed in claim 1, comprising generating a saw-tooth waveform, applying said Saw-tooth waveform to a respective band-pass filter for each of said pairs of channels, advancing the output from each filter by one-quarter of a cycle, modulating both the nonadvanced and the advanced outputs from each filter with said respective first information bearing signal, selectively connecting either the advanced modulated output therefrom to means for amplitude modulating the main carrier or the nonadvanced modulated output therefrom to means for frequency modulating the main carrier, in accordance with said respective second information bearing signal.